Jan. 7, 1941. H. L. BLOOD 2,228,195
OPERATING MEANS FOR PERMANENT MAGNET CHUCKS
Filed July 27, 1938
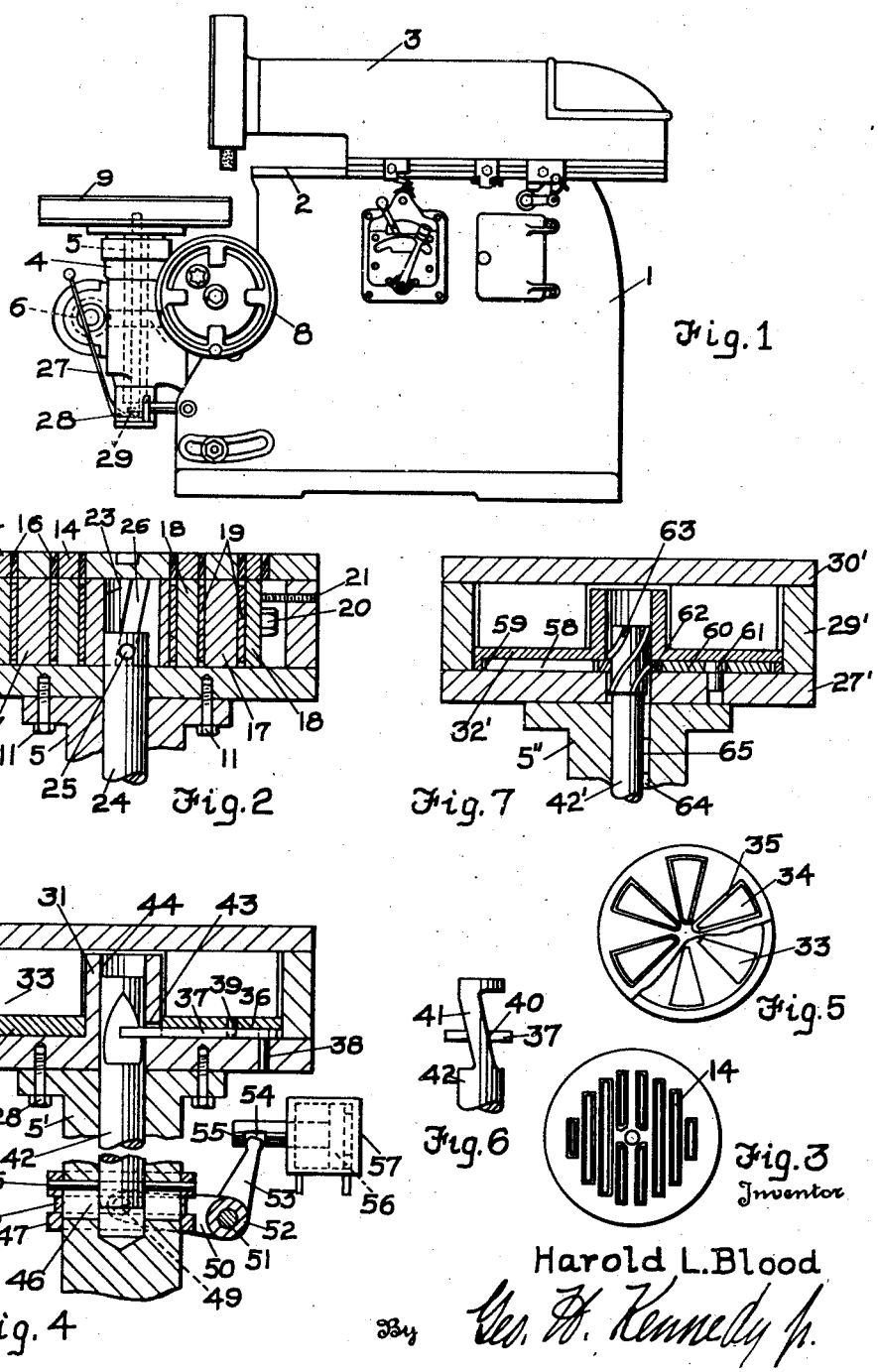
Inventor
Harold L. Blood
By Geo. H. Kennedy Jr.
Attorney Patented Jan. 7, 1941

2,228,195

UNITED STATES PATENT OFFICE 2,228,195

OPERATING MEANS FOR PERMANENT MAGNET CHUCKS

Harold L. Blood, Worcester, Mass., assignor to The Heald Machine Company, Worcester, Mass., a corporation of Massachusetts Application July 27, 1938, Serial No. 221,521

5 Claims. (Cl. 279—1)

The present invention relates to permanent magnet chucks, and particularly to a means for operating a permanent magnet chuck so that a piece of work positioned on the chuck may be removed.

Electrically energized magnet chucks for holding pieces of work for machining operations thereon are well known, and are entirely satisfactory in operation. There is, however, the disadvantage that electric power must be supplied to the chuck, and accordingly, conducting wires, or in the case of rotary chucks, collector rings and brushes must be utilized for conducting the power to the chuck. The objection to chucks of this character has been overcome by the use of permanent magnet chucks of the type shown, for example, in the Bower Patent No. 2,053,177, dated September 1, 1936. These chucks had originally the difficulty that there was no means for releasing the piece of work to allow its removal from the chuck, since the work must be removed against the holding action of the magnets.

A provision for deenergizing a permanent magnet chuck is described in the above cited Bower patent in which the poles of the permanent magnets are covered by separate pole pieces in the plate upon which the piece of work is placed. These pole pieces and the magnets are relatively movable, to insure that substantially all of the magnetic flux passes through the pole pieces so that the workpiece resting on the plate containing the pole pieces is thereby released. The structure by which the pole pieces and magnets are moved relative to each other, involves, in this patent, an oscillatory shaft connected by a linkage to the permanent magnets which are slidable in a casing beneath the chuck plate on which the workpieces rest. A crank on the end of the oscillatory shaft provides for shifting the position of the magnets into either workholding or work releasing position. This structure is generally satisfactory except where the chuck is mounted for rotation during the machining of a workpiece held thereby. When the chuck is used in this manner, the operating lever, or the oscillating shaft actuated by the lever, if the lever is removable, may frequently be so located, when the chuck is stopped, as to make extremely difficult the manual shifting of the permanent magnets for deenergizing the chuck.

One of the principal objects of the present invention is to provide a control means for permanent magnet chucks which will permit energizing or deenergizing of the chuck from a point remote from the chuck itself, thereby making immaterial the position of the chuck when being energized or deenergized. The invention is particularly applicable to rotary chucks in which the actuation of the chuck is obtained through an actuating member concentric to the chuck spindle so that the chuck may be energized or deenergized independently of its position on the machine.

Other and further objects and advantages of the invention will more fully appear from the following detailed description taken in connection with the accompanying drawing, in which—

Fig. 1 is a front elevation of a rotary surface grinder having mounted thereon a chuck embodying the invention.

Fig. 2 is a vertical sectional view of such a chuck.

Fig. 3 is a plan view of the chuck of Fig. 2.

Fig. 4 is a sectional view similar to Fig. 2, showing a modification.

Fig. 5 is a plan view of the chuck of Fig. 4.

Fig. 6 is a fragmentary elevation of a part of the actuating means of Fig. 3.

Fig. 7 is a sectional view similar to Fig. 2, showing a further modification.

Like reference characters refer to like parts in the different figures.

With reference first to Fig. 1, the machine has a base 1 on which is mounted for reciprocation on ways 2 a wheelhead 3. The reciprocation of the wheelhead is controlled by any suitable reversing mechanism which is not a feature of the invention. On the base 1 is also mounted a workhead 4 having a spindle 5 rotated by any suitable mechanism, as for example, the interengaging gears 6 and 7. Provision is made for vertical adjustment of the workhead by means of a hand wheel 8. On the upper end of the spindle 5 is mounted a permanent magnet chuck 9 which is adapted to hold work in position for grinding. Although the invention is shown in connection with a rotary surface grinder, it will be understood that the invention may as readily be applied to any other type of machine to which a magnetic chuck is applicable and the showing of the grinding machine is merely an instance of one use for the chuck embodying the invention.

With reference now to Fig. 2, the permanent magnet chuck has a base 10 secured as by bolts 11 to the upper end of the spindle 5 in the workhead. A casing 12 rests on the base plate 10 and a top or pole plate 13 is positioned on the upper end of the casing, the casing and top and bottom plates forming an enclosure for the magnetic unit and being suitably held together. The top plate has inner pole pieces 14 positioned in slots 15 therein, the inner pole pieces being insulated magnetically from the rest of the top plate by suitable strips 16 of non-magnetic material, which may be, for example, tin.

The magnetic unit which holds the workpieces in place on the upper side of the top plate 13 comprises a series of bar magnets 17 and a series of conductor bars 18, the latter being insulated from the bar magnets by suitable strips 19 of non-magnetic material. The bar magnets and conductor bars are all fastened together for movement as a unit, as by suitable bolts 20. The casing 12 is of a size to allow the magnet unit to be shifted laterally within the casing through a predetermined distance, the shifting movement being adjusted by suitable stop screws 21 and 22.

When the chuck is energized or in a condition to hold workpieces on the upper side of the top plate 13, the parts are in the position shown in Fig. 2, in which the magnetic flux from the upper end of the magnet 17 passes through the portion of the top plate directly thereabove and downwardly through the pole pieces 14 to the upper ends of the conductor bars 18, this flux accordingly passing through a workpiece or workpieces on the top plate. In effect the pole pieces 14 are magnetized to have a polarity opposite to that of the top plate. When the bar magnets and conductor bars are shifted to engage the adjusting screw 22 the bar magnets are no longer directly beneath the portions of the top plate between the pole pieces and instead these portions of the plate overlie both the upper ends of the bar magnets and the connector bars, so that the magnetic flux is no longer directed through a workpiece resting on the top plate, but is substantially entirely passed directly through the portions of the top plate or the pole pieces which bridge the spaces between the conductor bars and the bar magnets.

The above structure is not of itself the present invention; the latter involves a provision for shifting the magnetic unit relative to the top plate 13 so as to deenergize the chuck for releasing workpieces from the top plate. Although the term "deenergize" is utilized, the magnets are not themselves deenergized; on the contrary, the deenergization of the chuck merely involves a shifting of the lines of magnetic force so as to release the workpiece.

In accordance with the present invention, the magnetic unit has an elongated slot 23 therein for the reception of a rod 24 axially slidable in the spindle. The rod 24 has a projecting pin 25 in its upper end thereof for engagement in grooves 26 in opposite sides of the slot 23, only one of the grooves being shown. Upward movement of the rod 24 is effected by a hand lever 27, Fig. 1, pivoted on a pin 28 in a part of the workhead and having a lateral extension 29 engaging with the lower end of the rod 24. Vertical movement of the rod 24 by means of the lever 27 will cause a lateral shifting movement of the magnetic unit so that the conductor bars will be placed out of alinement with the inner poles 14. Thus the lines of force which normally pass through a workpiece positioned on the top plate will be directed through the top plate without passing through the pieces of work on the top plate so that a workpiece may be removed from the chuck.

It will be apparent that upward movement of the rod 24 shifts the magnetic unit to the left and against the adjusting screw 22, thereby placing the chuck in a deenergized condition. Downward movement of the rod 24 will restore the magnet unit to the position shown, so that the chuck will again be energized for holding a workpiece in position.

With reference to Fig. 4, which shows a modification, the chuck is designed so that it is deenergized by a slight turning movement of the permanent magnets relative to the top plate rather than a lateral movement of the permanent magnets, as in Fig. 2. As shown, the chuck comprises a bottom plate 27 secured as by bolts 28 to the upper end of the spindle 5' corresponding to the spindle 5 of Figs. 1 and 2. A casing 29 is positioned on the bottom plate and a top plate 30 closes the upper end of the casing 29. The bottom plate has a central upwardly extending boss 31 on which an inner plate 32 is turnable. The latter supports segment-shaped bar magnets 33 suitably insulated from each other as by non-magnetic strips, not shown. The top plate 30 has segment-shaped inner pole pieces 34, Fig. 5, insulated from the remainder of the top plate by suitable strips 35 of non-magnetic material, which may be, for example, tin. The bar magnets are obviously similar in shape and arrangement to the inner pole pieces 34. A permanent magnet chuck of this character is well known and need not be described in further detail.

In accordance with the present invention the permanent magnet chuck is deenergized to permit removal of pieces of work resting on the top plate 30 by a slight turning movement of the magnetic unit which will shift the bar magnets from positions directly in line with, and beneath, the inner pole pieces 34 to positions out of line therewith, so that the lines of force which normally pass through a workpiece positioned on the top plate will be short-circuited through the top plate, thereby releasing a piece of work resting on the chuck. To this end the plate 32 has a radial slot 36 in which is positioned a lever 37, the outer end of which is pivoted on a pin 38 extending upwardly from the bottom plate 27. The lever 37 between its ends, engages with a pin 39 projecting downwardly from the plate 32 and the inner end of the lever is notched, as at 40, Fig. 6, to receive a diagonally extending bar 41 forming an integral part of an upwardly projecting rod 42 axially slidable in the hollow spindle 5'. Vertical movement of the rod 42 will cause rocking movement of the lever 37 about the pin 38 as an axis and will therefore provide a slight angular movement of the magnetic unit relative to the top plate. A slot 43 in the boss 31 allows the lever to extend into the axial opening 44 in the bottom plate 27 in which the rod 42 is slidable.

For vertical movement of the rod 42, which may be procured either automatically or manually, the lower end of the rod has a transversely extending pin 45 extending through a diametrically positioned slot 46 in the spindle 5'. The outer ends of the pin 45 engage a collar 47 slidable on the spindle 5' and having a central annular groove 48 for engagement with a projecting pin 49 on one arm 50 of a bell crank lever 51 turnable on a pin 52. The other arm 53 of the bell crank lever engages with a notch 54 in a piston rod 55 connected to a piston 56 slidable in a casing 57. Fluid under pressure is selectively directed to either end of the casing 57 by means of a suitable valve, not shown, which may be arranged for manual control. If desired, the control valve may be interconnected with the machine movements so that the shifting of the magnetic unit for deenergizing the chuck will be procured automatically at the termination of the grinding operation after the rotation of the chuck has been stopped.

With reference now to Fig. 7, the chuck therein shown is very similar in construction to the chuck of Fig. 4. The machine spindle 5" has mounted thereon a bottom plate 27'. A casing 29' surrounds the permanent magnetic unit and the latter is covered by a top plate 30'. The inner plate 32' in this modification has an annular recess 58 having gear teeth 59 on its inner periphery. A gear 60, engageable with the teeth 59, is positioned in the recess 58 and is turnable on a stud 61 projecting from the bottom plate 27'. A pinion 62 surrounds the upper end of the actuated rod 42' and has helical notches on its inner surface to engage with a multiple thread 63 on the upper end of the rod. The latter is shifted vertically by any suitable mechanism, as for example, the mechanism shown in either Fig. 1 or Fig. 4, and the axial shifting movement of the rod procures, through the gears 60 and 62, a slight turning movement of the magnetic unit for deenergizing the chuck. It will be understood that the spindles 5, 5' and 5" have means for assuring a rotation of the chuck actuating rods therewith, and to this end, as shown in Fig. 5, the spindle 5" has an elongated keyway 64 to receive a key 65 positioned in the actuating rod 42'.

With the magnetic unit in a position for energization of the chuck it will be apparent that the pole pieces have a polarity opposite to that of the remainder of the top or pole plate so that the workpiece is securely held against the face of the chuck by such magnetism. When the magnetic unit is moved into position for the chuck to be deenergized, the magnetic unit is in such a position that the top plate is demagnetized so that the pole pieces and pole plate are not of opposite polarity and the workpiece is no longer held securely against the chuck face.

From the foregoing it will be apparent that the invention provides a means for energizing or deenergizing a permanent magnet chuck which is operable independently of the position in which the chuck stops. Especially in rotary chucks, the latter are deenergized by means of a rod slidable axially of the spindle on which the chuck is mounted, so that the chuck may be energized or deenergized independently of the position of the chuck when it comes to rest.

I claim:

1. In a rotary permanent-magnet chuck, a base member, a rotary spindle on which said member is mounted, a pole plate on said base member having a plurality of spaced pole pieces, each of which is magnetically insulated from the remainder of the pole plate, a magnetic unit incorporating permanent magnets engageable with the pole plate for imparting to the pole pieces a polarity opposite to the polarity of the remainder of the pole plate, said unit being movable relative to said pole plate for demagnetizing the pole plate, a rod positioned centrally of and movable axially of the spindle, and connecting means between the rod and said unit for shifting said unit relative to the pole plate in response to axial movement of the rod.

2. In a rotary permanent-magnet chuck, a base member, a rotary spindle on which said member is mounted, a pole plate on said base member having a plurality of spaced pole pieces, each of which is magnetically insulated from the remainder of the pole plate, a magnetic unit incorporating permanent magnets engageable with the pole plate for imparting to the pole pieces a polarity opposite to the polarity of the remainder of the pole plate, said unit being movable relative to said pole plate for demagnetizing the pole plate, a rod positioned centrally of and movable axially of the spindle, connecting means between the rod and said unit for shifting said unit relative to the pole plate in response to axial movement of the rod, and means engageable with the rod at a point spaced from the chuck for shifting said rod.

3. In a rotary permanent-magnet chuck, a base member, a rotary spindle on which said member is mounted, a pole plate on said base member having a plurality of spaced pole pieces, each of which is magnetically insulated from the remainder of the pole plate, a magnetic unit incorporating permanent magnets engageable with the pole plate for imparting to the pole pieces a polarity opposite to the polarity of the remainder of the pole plate, said unit being movable relative to said pole plate for demagnetizing the pole plate, a rod positioned centrally of and movable axially of the spindle, connecting means between the rod and said unit for shifting said unit relative to the pole plate in response to axial movement of the rod, and fluid pressure means engageable with the rod at a point spaced from the chuck for shifting said rod.

4. In a rotary permanent-magnet chuck, a base member, a rotary spindle on which said member is mounted, a pole plate on said base member having a plurality of spaced pole pieces, each of which is magnetically insulated from the remainder of the pole plate, a magnetic unit incorporating permanent magnets engageable with the pole plate for imparting to the pole pieces a polarity opposite to the polarity of the remainder of the pole plate, said unit being angularly movable relative to said pole plate for demagnetizing the pole plate, a rod positioned centrally of and movable axially of the spindle, and connecting means between the rod and the unit for turning said unit angularly in response to axial movement of the rod.

5. In a rotary permanent-magnet chuck, a base member, a rotary spindle on which said member is mounted, a pole plate on said base member having a plurality of spaced pole pieces, each of which is magnetically insulated from the remainder of the pole plate, a magnetic unit incorporating permanent magnets engageable with the pole plate for imparting to the pole pieces a polarity opposite to the polarity of the remainder of the pole plate, said unit being angularly movable relative to said pole plate for demagnetizing the pole plate, a rod positioned centrally of and movable axially of the spindle, connecting means between the rod and the unit for turning said unit angularly in response to axial movement of the rod, and means engageable with the rod at a point remote from its connection to the magnetic unit for shifting said rod.

HAROLD L. BLOOD.